US012802904B2

(12) United States Patent
Chen et al.

(10) Patent No.: US 12,802,904 B2
(45) Date of Patent: Nov. 17, 2026

(54) MAGNETIC SUSPENSION KEYSWITCH STRUCTURE

(71) Applicant: ELGATO IDISPLAY LIMITED, New Taipei City (TW)

(72) Inventors: Jen-Fu Chen, New Taipei City (TW); Chia-Hsin Tsai, New Taipei City (TW); Lung-Chi Lu, New Taipei City (TW)

(73) Assignee: ELGATO IDISPLAY LIMITED, New Taipei City (TW)

( * ) Notice: Subject to any disclaimer, the term of this patent is extended or adjusted under 35 U.S.C. 154(b) by 303 days.

(21) Appl. No.: 18/663,205

(22) Filed: May 14, 2024

(65) Prior Publication Data

US 2025/0157752 A1 May 15, 2025

(30) Foreign Application Priority Data

Nov. 9, 2023 (TW) ................................ 112143120

(51) Int. Cl.
*H01H 13/14* (2006.01)
*H01H 13/70* (2006.01)

(52) U.S. Cl.
CPC ............ *H01H 13/14* (2013.01); *H01H 13/70* (2013.01); *H01H 2221/04* (2013.01)

(58) Field of Classification Search
CPC ........... H01H 2221/04; H01H 2003/12; H01H 2013/00; H01H 2013/02; H01H 2071/048; H01H 2071/10; H01H 2071/1036; H01H 2205/00; H01H 2205/002; H01H 2036/00; H01H 1/00; H01H 1/54; H01H 1/58; H01H 3/00; H01H 3/02; H01H 3/12; H01H 5/00; H01H 5/02; H01H 13/00; H01H 13/12; H01H 13/14; H01H 13/50; H01H 13/52; H01H 13/70; H01H 21/00; H01H 21/02; H01H 21/18; H01H 2001/12; H01H 2001/22; H01H 2001/54
(Continued)

(56) References Cited

U.S. PATENT DOCUMENTS

2013/0249658 A1* 9/2013 Kan ...................... H01H 36/00
335/206

FOREIGN PATENT DOCUMENTS

CN 106298328 A * 1/2017 ............ H01H 13/86
CN 217768189 U 11/2022
(Continued)

*Primary Examiner* — Anthony R Jimenez
(74) *Attorney, Agent, or Firm* — Li & Cai Intellectual Property (USA) Office

(57) ABSTRACT

A magnetic suspension keyswitch structure includes a receiving frame and a keycap. The receiving frame includes a keycap receiving hole, a pair of first receiving spaces, and a pair of first magnetic members. The first receiving spaces are formed on two inner walls of the receiving frame. The first magnetic member is fixedly received in the first receiving space. The keycap includes a plurality of side surfaces, a pair of second receiving spaces, and a pair of second magnetic members fixedly received in the second receiving spaces. Through a magnetic force between the first magnetic member and the second magnetic member, a top surface of the keycap is normally higher than a top surface of the receiving frame and in a non-pressed state. When the keycap is pressed downward, the magnetic force provides a recovery force to the keycap.

12 Claims, 8 Drawing Sheets

(58) Field of Classification Search
USPC .......................................................... 200/341
See application file for complete search history.

(56) References Cited

FOREIGN PATENT DOCUMENTS

| | | | |
|---|---|---|---|
| DE | 69529978 | T2 | 1/2004 |
| EP | 0749138 | B1 | 3/2003 |
| GB | 2099762 | A | 12/1982 |
| TW | M303430 | U | 12/2006 |
| TW | M477034 | U | 4/2014 |
| TW | 201640546 | A | 11/2016 |
| TW | M653130 | U | 3/2024 |

* cited by examiner

MAGNETIC SUSPENSION KEYSWITCH STRUCTURE

CROSS-REFERENCE TO RELATED PATENT APPLICATION

This application claims the benefit of priority to Taiwan Patent Application No. 112143120, filed on Nov. 9, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a magnetic suspension keyswitch structure, and more particularly to a magnetic suspension keyswitch structure that uses a magnetic force to support a keycap, so as to provide a recovery force to the keycap.

BACKGROUND OF THE DISCLOSURE

Some existing push buttons can have a display function, for which a display module is arranged under a keycap of the push button. In addition, the keycap can be made of a transparent material, so that an image on the display module can be shown upward through the keycap. However, a supporting structure of the existing push button under the keycap may shield some images of the display module.

Therefore, how to simplify the supporting structure of a keyswitch and further provide a transparent button display effect through improvements in structural design, so as to overcome the above-mentioned deficiencies, has become one of the important issues to be addressed in this field.

SUMMARY OF THE DISCLOSURE

In response to the above-referenced technical inadequacies, the present disclosure provides a magnetic suspension keyswitch structure, so as to simplify a supporting structure of a keyswitch and provide a transparent button display effect.

In order to solve the above-mentioned problems, one of the technical aspects adopted by the present disclosure is to provide a magnetic suspension keyswitch structure, which includes a receiving frame and a keycap. The receiving frame includes a keycap receiving hole, a pair of first receiving spaces, and a pair of first magnetic members. The keycap receiving hole is surrounded by a plurality of inner walls. The pair of first receiving spaces are formed on two of the inner walls of the receiving frame. The pair of first magnetic members are received and fixed in the pair of first receiving spaces, respectively. The keycap includes a plurality of side surfaces, a pair of second receiving spaces, and a pair of second magnetic members. The pair of second receiving spaces are formed on two of the side surfaces, respectively. The pair of second magnetic members are received and fixed in the pair of second receiving spaces, respectively. Through a magnetic force between the pair of first magnetic members and the pair of second magnetic members, a top surface of the keycap is normally higher than a top surface of the receiving frame and in a non-pressed state. When the keycap is pressed downward, the magnetic force provides a recovering force to the keycap.

Therefore, in the magnetic suspension keyswitch structure provided by the present disclosure, due to the multiple magnetic members disposed between the keycap and the receiving frame, the keycap can be suspended in the receiving frame in a floating manner through the magnetic force. Specifically, the receiving frame includes the pair of first magnetic members, and the keycap includes the pair of second magnetic members. Through the magnetic force between the pair of first magnetic members and the pair of second magnetic members, the top surface of the keycap is normally higher than the top surface of the receiving frame and in the non-pressed state. When the keycap is pressed downward, the magnetic force provides the keycap a force to return to an original position. In this way, the supporting structure of the keyswitch can be simplified, and the keyswitch can provide the transparent button display effect.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
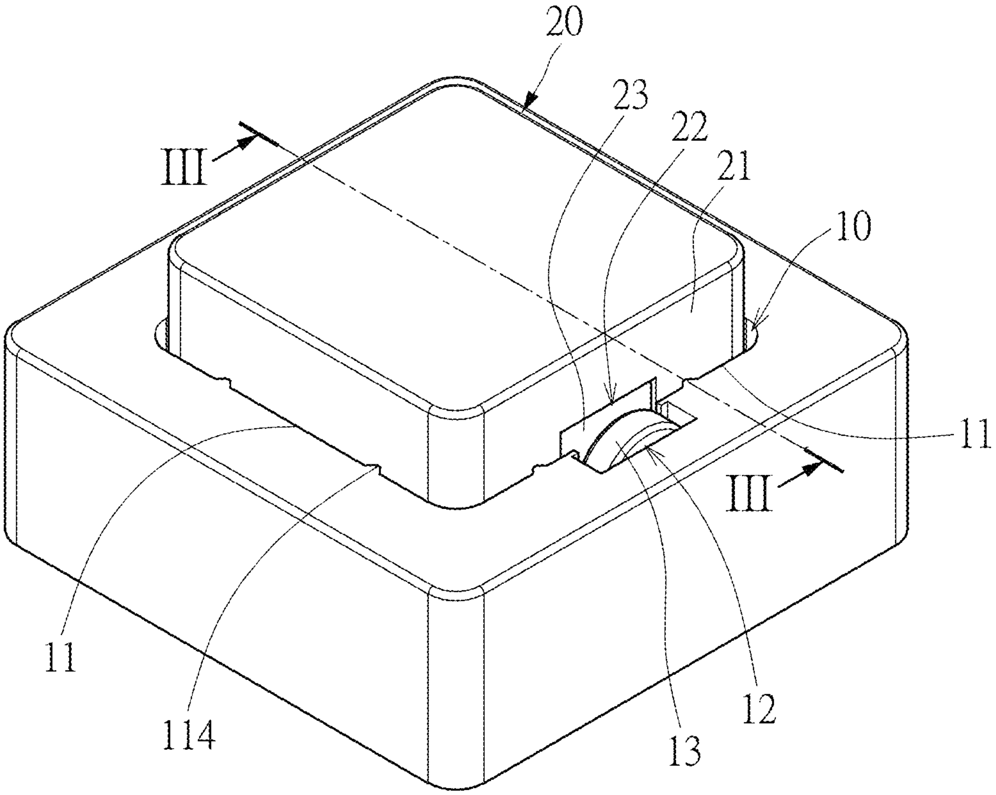
FIG. 1 is a schematic perspective view of a magnetic suspension keyswitch structure according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1 to FIG. 4, a first embodiment of the present disclosure provides a magnetic suspension keyswitch structure, which includes a receiving frame 10 and a keycap 20. There are a plurality of magnetic members which are arranged between the keycap 20 and the receiving frame 10, so that the keycap 20 can be suspended in the receiving frame 10 through a magnetic force.

Figure 2:
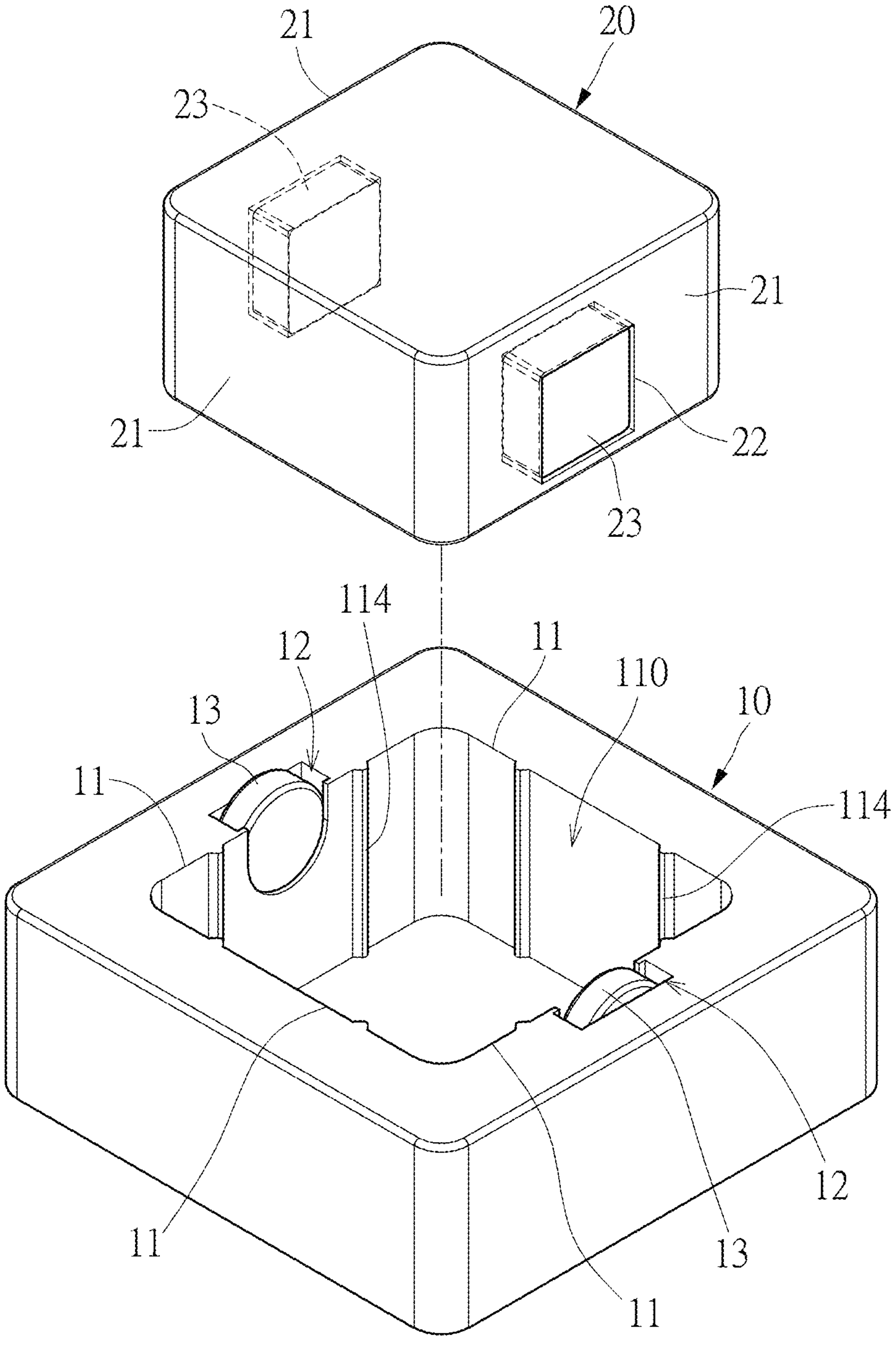
FIG. 2 is an exploded perspective view of the magnetic suspension keyswitch structure according to the first embodiment of the present disclosure.

Reference is made to FIG. 2. Specifically, the receiving frame 10 includes a keycap receiving hole 110, a pair of first receiving spaces 12, and a pair of first magnetic members 13. The receiving frame 10 can be made of, for example, plastic. In this embodiment, the receiving frame 10 is made of non-ferromagnetic materials. The keycap receiving hole 110 is surrounded by a plurality of inner walls 11. The pair of first receiving spaces 12 are concavely formed on two of the inner walls 11. In this embodiment, the first receiving spaces 12 are also concaved downwardly from the receiving frame 10. The pair of first magnetic members 13 are respectively received and fixed in the pair of first receiving spaces 12. The first magnetic member 13 can be strong magnets and disc-shaped. The first magnetic member 13 can be fixed in the first receiving space 12 in a tight fit manner. However, the present disclosure is not limited thereto.

The keycap receiving hole 110 is exemplified as being one in this embodiment, but the present disclosure is not limited thereto. The receiving frame 10 can be formed with more than one keycap receiving hole. In addition, the keycap receiving hole 110 is exemplified as having a rectangular shape in this embodiment, but the present disclosure is not limited thereto. The shape of the keycap receiving hole can be polygonal, circular, or oblong.

Specifically, the keycap 20 includes a plurality of side surfaces 21, a pair of second receiving spaces 22, and a pair of second magnetic members 23. The pair of second receiving spaces 22 are concavely formed on two of the side surfaces 21. The pair of second magnetic members 23 are respectively received and fixed in the pair of second receiving spaces 22. A surface of the second magnetic member 23 is flush with or slightly lower than the side surface 21 of the keycap 20. The second receiving space 22 corresponds in shape to the second magnetic member 23. The second receiving space 22 is exemplified as being square in this embodiment. The second magnetic member 23 can be a super strong magnet, such as a neodymium magnet. The keycap 20 corresponds in shape to the keycap receiving hole 110. The keycap 20 is exemplified as being rectangular in this embodiment, but the present disclosure is not limited thereto. The shape of the keycap can be polygonal, circular, or oblong.

Figure 3:
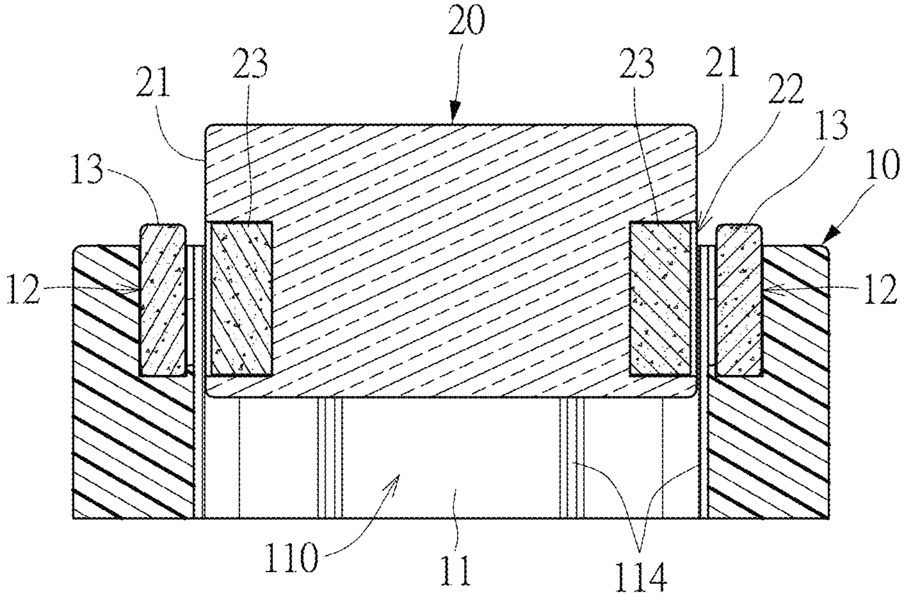
FIG. 3 is a cross-sectional view taken along line III-III of FIG. 1 and showing the magnetic suspension keyswitch structure in a non-pressed state.
Figure 4:
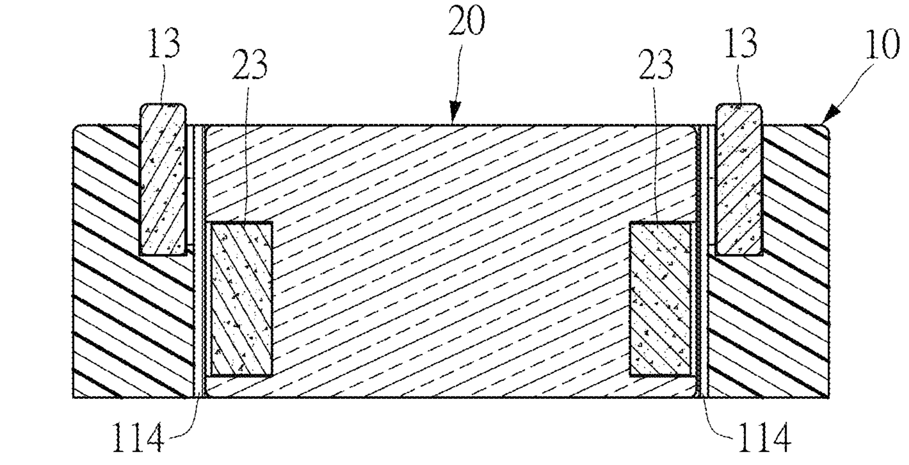
FIG. 4 is a cross-sectional view of the magnetic suspension keyswitch structure in a pressed state according to the first embodiment of the present disclosure.

Reference is made to FIG. 3, which is a cross-sectional view taken along a magnetic member according to the present disclosure. In this embodiment, by the magnetic force between the pair of first magnetic members 13 and the pair of second magnetic members 23, a top surface of the keycap 20 is normally higher than a top surface of the receiving frame 10 and in a non-pressed state. Referring to FIG. 4, when the keycap 20 is pressed downward, the magnetic force can provide a recovering force to the keycap 20, thereby enabling the keycap 20 to return to an original position as shown in FIG. 3.

The magnetic suspension keyswitch structure of this embodiment does not need any supporting element. The space under the keycap 20 is completely released. The keycap 20 and the receiving frame 10 can both be made of a transparent material. A flat-panel monitor (not shown) can be placed under the magnetic suspension keyswitch structure, so that graphics on the flat-panel monitor can be displayed through the keycap.

In detail, in this embodiment, each inner wall 11 of the receiving frame 10 forms at least one protruding portion 114. The at least one protruding portion 114 abuts against the side surface 21 of the keycap 20, so as to reduce a friction force between the keycap 20 and the receiving frame 10. Specifically, the protruding portion 114 is shaped in a straight rib, and parallel to a pressing direction of the keycap 20.

Through the magnetic force between the pair of first magnetic members 13 and the pair of second magnetic members 23, the keycap 20 of this embodiment is normally limited to the non-pressed state. However, the present disclosure is not limited thereto. A limiting structure can be further configured in the present disclosure.

Second Embodiment

Figure 5:
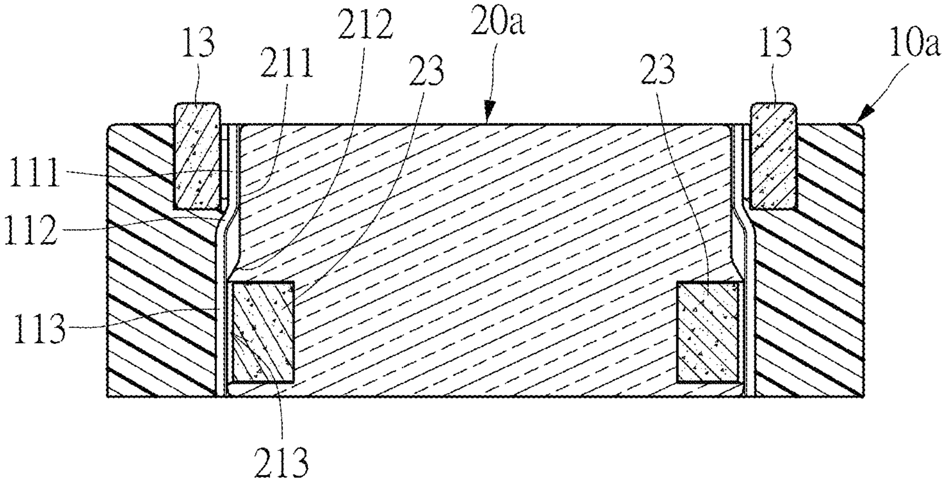
FIG. 5 is a cross-sectional view of the magnetic suspension keyswitch structure in the pressed state according to a second embodiment of the present disclosure.

Referring to FIG. 5, a second embodiment of the present disclosure is provided. The difference between the first and second embodiments is that the limiting structure is formed on at least one of the inner walls 11 of a receiving frame 10*a*, so as to structurally restrict an upward displacement of a keycap 20*a*. Specifically, at least one of the inner walls 11 of the receiving frame 10*a* is formed with an upper erected surface 111, an oblique surface 112, and a lower erected surface 113. The oblique surface 112 is connected between the upper erected surface 111 and the lower erected surface 113. The upper erected surface 111 and the lower erected surface 113 can be parallel to each other. Correspondingly, at least one of the side surfaces 21 of the keycap 20*a* is formed to have an upper side 211, a lateral inclined side 212, and a lower side 213. The lateral inclined side 212 is connected between the upper side 211 and the lower side 213. The upper side 211 and the lower side 213 can be parallel to each other. Therefore, when the keycap 20*a* is in a non-pressed state, the lateral inclined side 212 of the keycap 20*a* abuts against the oblique surface 112 of the receiving frame 10*a*.

In this embodiment, the limiting structure is preferably formed on each of two opposite ones of the inner walls 11 of the receiving frame 10*a*, and each of two of the side surfaces 21 of the keycap 20*a*. Alternatively, the limiting structure can be formed on all of the inner walls.

Third Embodiment

Figure 6:
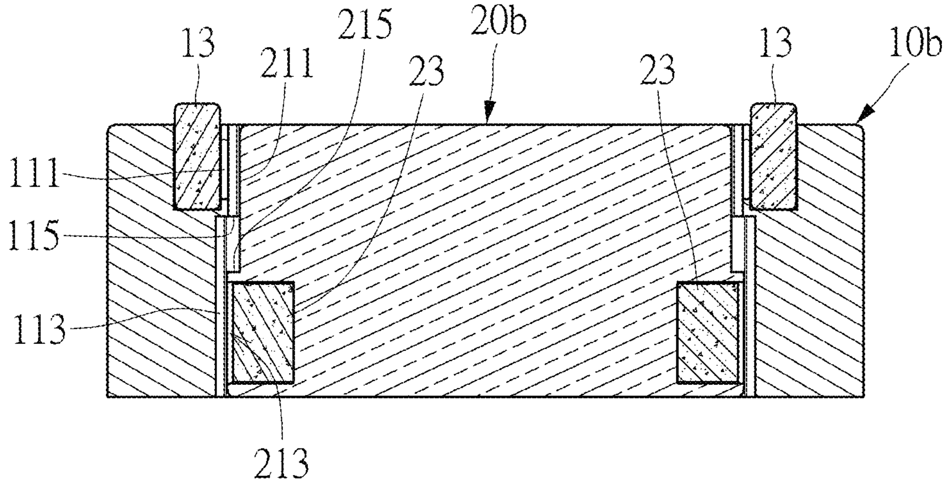
FIG. 6 is a cross-sectional view of the magnetic suspension keyswitch structure in the pressed state according to a third embodiment of the present disclosure.

Referring to FIG. 6, a second type of the limiting structure is formed between a receiving frame 10*b* and a keycap 20*b* of this embodiment. Specifically, at least one of the inner walls 11 of the receiving frame 10*b* forms the upper erected surface 111, an inner stepped surface 115, and the lower erected surface 113. The inner stepped surface 115 is substantially and perpendicularly connected between the upper erected surface 111 and the lower erected surface 113. At least one of the side surfaces 21 of the keycap 20*b* forms the upper side 211, an outer stepped side 215, and the lower side 213. The outer stepped side 215 is substantially and perpendicularly connected between the upper side 211 and the lower side 213. Therefore, when the keycap 20*b* is in the non-pressed state, the outer stepped side 215 abuts against the inner stepped surface 115.

In this embodiment, the limiting structure is preferably formed on each of two opposite ones of the inner walls 11 of the receiving frame 10*b*, and each of two of the side surfaces 21 of the keycap 20*b*. Alternatively, the limiting structure can be formed on all of the inner walls.

Fourth Embodiment

Figure 7:
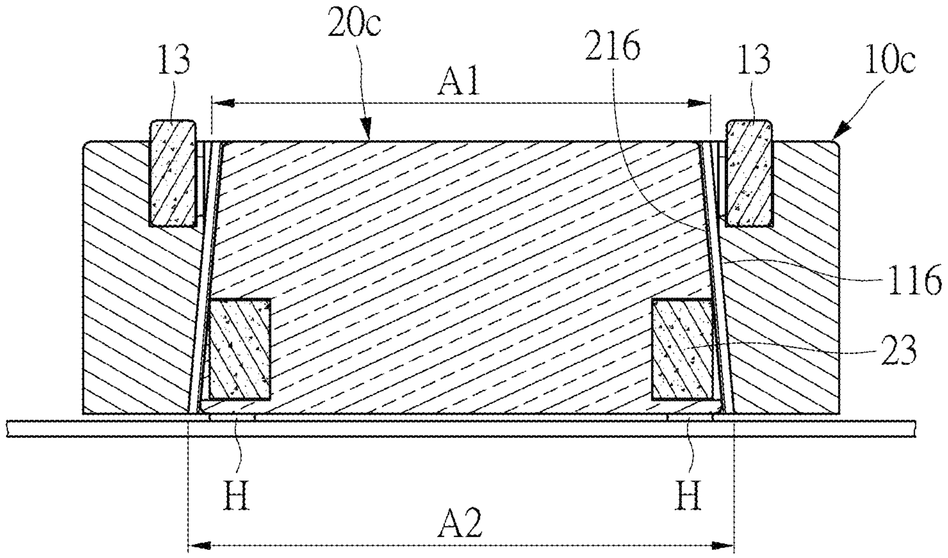
FIG. 7 is a cross-sectional view of the magnetic suspension keyswitch structure in the pressed state according to a fourth embodiment of the present disclosure.

Referring to FIG. 7, a third type of the limiting structure is formed between a receiving frame 10*c* and a keycap 20*c* in this embodiment. Specifically, at least one of the inner walls 11 of the receiving frame 10*c* is formed to have a first inclined surface 116, and at least one of the side surfaces 21 of the keycap 20*c* is formed to have a second inclined surface 216. When the keycap 20*c* is in the non-pressed state, the second inclined surface 216 can abut against the first inclined surface 116.

In this embodiment, the limiting structure is preferably formed on each of two opposite ones of the inner walls 11 of the receiving frame 10*c*, and each of two of the side surfaces 21 of the keycap 20*c*. Alternatively, the limiting structure can be formed on all of the inner walls.

In the above-mentioned embodiments of the limiting structure, the keycap receiving hole 110 has an upper opening area A1 defined on a top surface of the receiving frame 10*c*, and a lower opening area A2 defined on a bottom surface of the receiving frame 10*c*. The upper opening area A1 is smaller than the lower opening area A2.

It is worth mentioning that the keycap of the present embodiment can, for example, mechanically, capacitively, or magnetically trigger a signal. As shown in FIG. 7, a Hall sensor is used in cooperation with the magnetic triggering. A Hall sensor H can be disposed under the keycap 20*c*. When the keycap 20*c* is pressed and displaced, the Hall sensor H senses a change in the magnetic field and provides a trigger signal. However, the present disclosure is not limited to the above examples. The Hall sensor can be disposed on the inner wall of the receiving frame.

Fifth Embodiment

Figure 8:
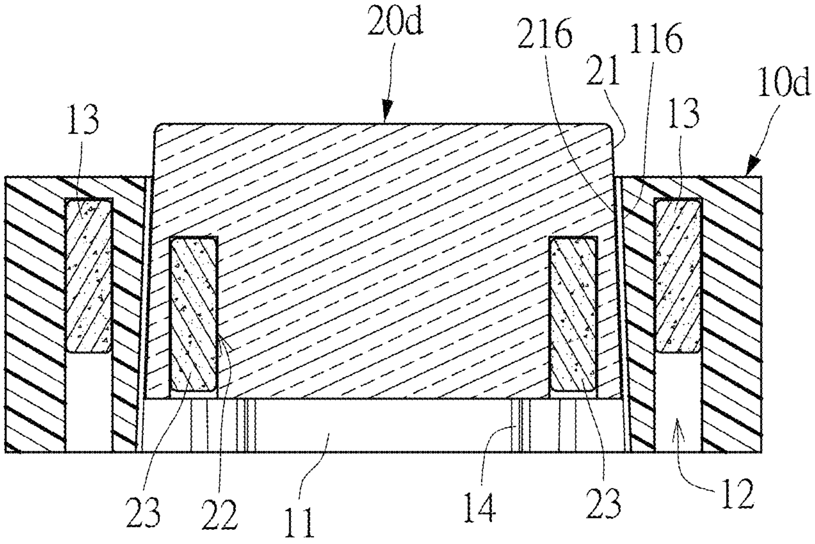
FIG. 8 is a cross-sectional view of the magnetic suspension keyswitch structure in the pressed state according to a fifth embodiment of the present disclosure.

Referring to FIG. 8, a hidden receiving structure for magnetic members is formed between a receiving frame 10*d* and a keycap 20*d* in this embodiment. Specifically, the receiving frame 10*d* is formed with a pair of first receiving spaces 12 that are concaved from a bottom surface of side walls of the receiving frame 10*d*. The pair of first receiving spaces 12 is concavely formed on two bottom sides of the receiving frame 10*d*. The pair of first magnetic members 13 are mounted in the first receiving spaces 12, respectively.

Similarly, the keycap 20*d* is formed with a pair of second receiving spaces 22 that are concaved from a bottom surface of the keycap 20*d*. The pair of second receiving spaces 22 is concavely formed on two bottom sides of the keycap 20*d*. The pair of second magnetic members 23 are mounted in the second receiving spaces 22, respectively.

In this embodiment, the limiting structure is like the third type in FIG. 7. The limiting structure can be formed on all of the inner walls, or at least two opposite inner walls. At least one of the inner walls 11 of the receiving frame 10*d* is formed to have a first inclined surface 116, and at least one of the side surfaces 21 of the keycap 20*d* is formed to have a second inclined surface 216. When the keycap 20*c* is in the non-pressed state, the second inclined surface 216 can abut against the first inclined surface 116.

Sixth Embodiment

Figure 9:
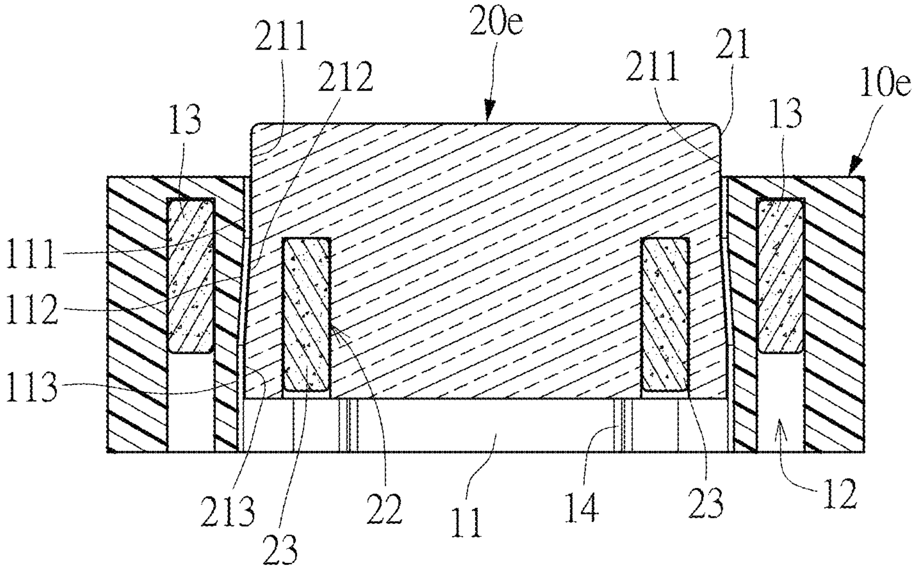
FIG. 9 is a cross-sectional view of the magnetic suspension keyswitch structure in the pressed state according to a sixth embodiment of the present disclosure.

Referring to FIG. 9, this embodiment shows that the first magnetic members 13 and the second magnetic members 23 are also respectively received in the receiving frame 10*d* and the keycap 20*d* in a hidden manner.

The limiting structure of this embodiment is like the second embodiment as shown in FIG. 5. Specifically, at least one of the inner walls 11 of the receiving frame 10*e* is formed with an upper erected surface 111, an oblique surface 112, and a lower erected surface 113. The oblique surface 112 is connected between the upper erected surface 111 and the lower erected surface 113. The upper erected surface 111 and the lower erected surface 113 can be parallel to each other.

Correspondingly, at least one of the side surfaces 21 of the keycap 20*e* is formed to have an upper side 211, a lateral inclined side 212, and a lower side 213. The lateral inclined side 212 is connected between the upper side 211 and the lower side 213. The upper side 211 and the lower side 213 can be parallel to each other. Therefore, when the keycap 20*a* is in a non-pressed state, the lateral inclined side 212 of the keycap 20*a* abuts against the oblique surface 112 of the receiving frame 10*e*.

Seventh Embodiment

Figure 10:
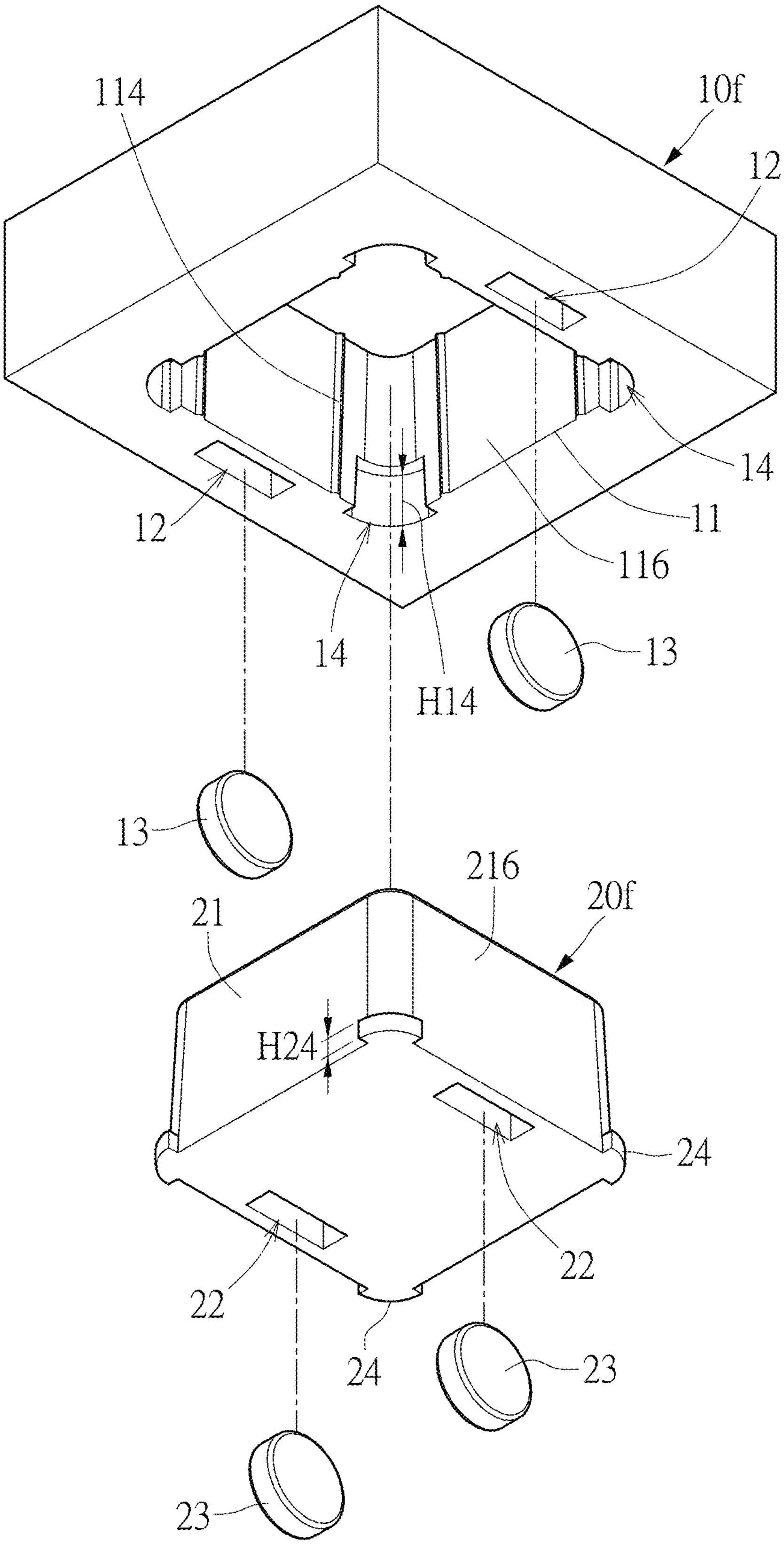
FIG. 10 is an exploded perspective view of the magnetic suspension keyswitch structure according to a seventh embodiment of the present disclosure.

Referring to FIG. 10, this embodiment further provides a positioning and stop structure for a keycap 20*f*. The keycap 20*f* has a plurality of stop protrusions 24 that are protruded outward from a bottom periphery of the keycap 20*f*. Each stop protrusion 24 is shaped like a fan on a bottom corner, and is aligned with the bottom surface of the keycap 20*f*. Correspondingly, a receiving frame 10*f* has a plurality of stop recesses 14 that are formed on the inner walls 11. The stop recesses 14 are formed at four corners of the inner walls 11. A height H14 of the stop recess 14 is higher than a height H24 of the stop protrusion 24, so that the stop protrusion 24 is movably disposed in the stop recess 14. The stroke distance of the keycap 20*f* can be controlled precisely by the height H24 of the stop protrusion 24. When the keycap 20*f* is in a non-pressed state, the second inclined 216 of the keycap 20*e* can be arranged to not abut against the first inclined surface 116 of the receiving frame 10*e*. Therefore, it can be avoid a frictional pressing force happened between the keycap 20*f* and the receiving frame 10*e*.

Eighth Embodiment

Figure 11:
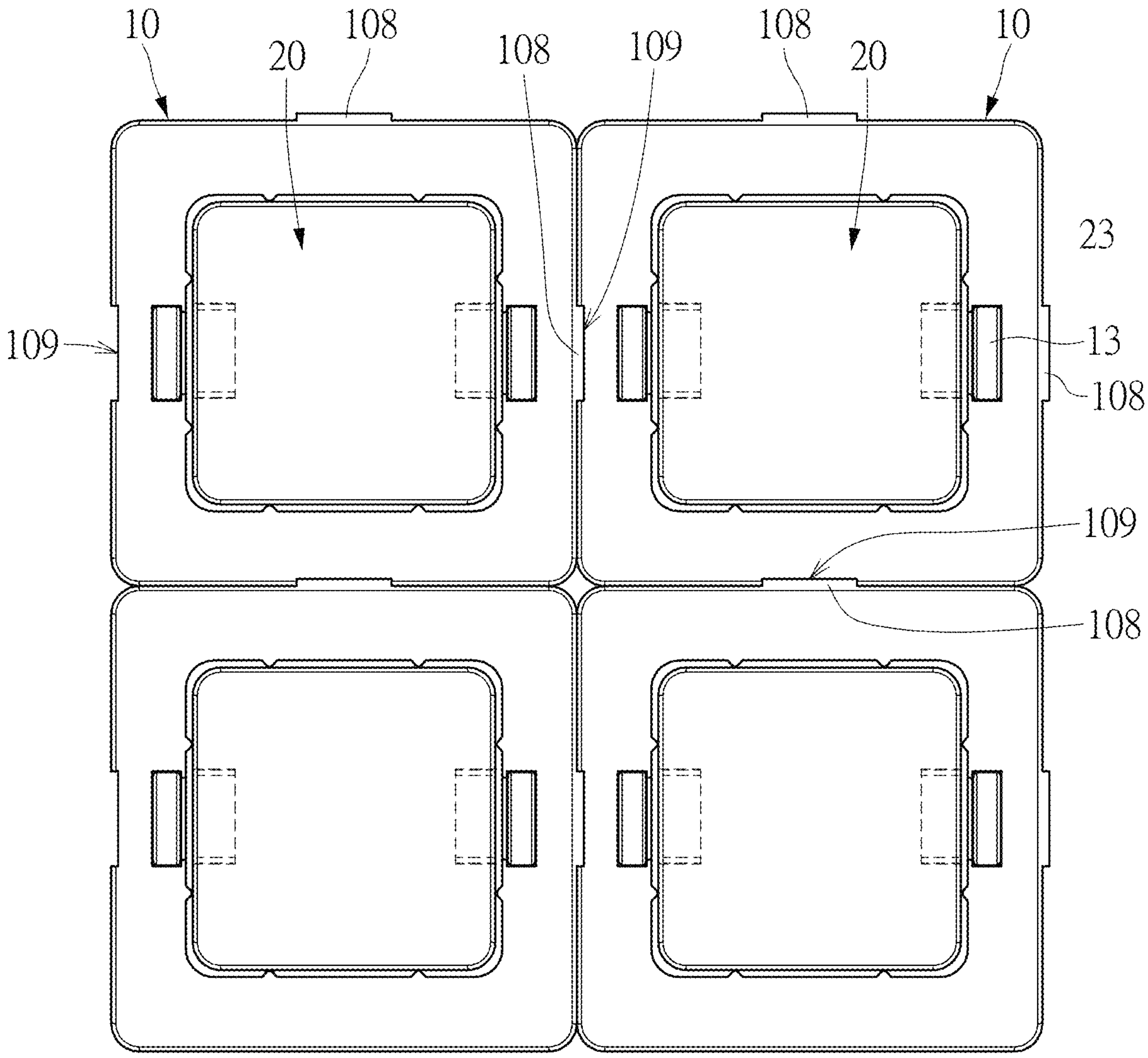
FIG. 11 is a schematic view showing multiple ones of the magnetic suspension keyswitch structure being joined together according to an eighth embodiment of the present disclosure.

Referring to FIG. 11, this embodiment shows that multiple ones of the magnetic suspension keyswitch structure can be assembled to each other for formation of a keyboard. An outer side surface of the receiving frame 10 forms a wedging structure, which can be used to join with another receiving frame 10. In this embodiment, the wedging structure can be a protruding tenon 108 or a wedging mortise 109. For example, a periphery of each receiving frame 10 includes two protruding tenons 108 and two wedging mortises 109, so that users can use these keyswitches to arrange a variety of different control keyboards according to practical requirements. This embodiment can be applied to any one embodiments described above.

BENEFICIAL EFFECTS OF THE EMBODIMENTS

In conclusion, in the magnetic suspension keyswitch structure provided by the present disclosure, due to the multiple magnetic members disposed between the keycap and the receiving frame, the keycap can be suspended in the receiving frame in a floating manner through the magnetic force.

Specifically, the receiving frame includes the pair of first magnetic members, and the keycap includes the pair of second magnetic members. Through the magnetic force between the pair of first magnetic members and the pair of second magnetic members, the top surface of the keycap is normally higher than the top surface of the receiving frame and in the non-pressed state. When the keycap is pressed downward, the magnetic force provides the keycap a force to return to the original position. In this way, a supporting structure of the keyswitch can be simplified, and the keyswitch can provide a transparent button display effect.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A magnetic suspension keyswitch structure, comprising:

a receiving frame including a keycap receiving hole, a pair of first receiving spaces, and a pair of first magnetic members, the keycap receiving hole being surrounded by a plurality of inner walls, the pair of first receiving spaces being formed on two of the inner walls of the receiving frame, and the pair of first magnetic members being received and fixed in the pair of first receiving spaces, respectively; and a keycap including a plurality of side surfaces, a pair of second receiving spaces, and a pair of second magnetic members, the pair of second receiving spaces being respectively formed on two of the plurality of side surfaces of the keycap, and the pair of second magnetic members being received and fixed in the pair of second receiving spaces, respectively;

wherein, through a magnetic force between the pair of first magnetic members and the pair of second magnetic members, a top surface of the keycap is normally higher than a top surface of the receiving frame and in a non-pressed state; wherein, when the keycap is pressed downward, the magnetic force provides a recovering force to the keycap;

wherein at least one of the inner walls of the receiving frame is formed to have an upper erected surface, an oblique surface, and a lower erected surface, and the oblique surface is connected between the upper erected surface and the lower erected surface;

wherein at least one of the plurality of side surfaces of the keycap is formed to have an upper side, a lateral inclined side, and a lower side, and the lateral inclined side is connected between the upper side and the lower side;

wherein, when the keycap is in the non-pressed state, the lateral inclined side abuts against the oblique surface.

2. The magnetic suspension keyswitch structure according to claim 1, wherein a limiting structure is formed on at least one of the inner walls of the receiving frame.

3. The magnetic suspension keyswitch structure according to claim 1, wherein the keycap receiving hole has an upper opening area defined on the top surface of the receiving frame and a lower opening area defined on a bottom surface of the receiving frame, and the upper opening area is smaller than the lower opening area.

4. The magnetic suspension keyswitch structure according to claim 1, wherein a wedging structure is formed on an outer side surface of the receiving frame, so as to be wedged with another one of the receiving frame.

5. The magnetic suspension keyswitch structure according to claim 1, wherein the pair of first receiving spaces is concavely formed on two of the inner walls of the receiving frame, and the pair of second receiving spaces is concavely formed on two of the plurality of side surfaces of the keycap.

6. The magnetic suspension keyswitch structure according to claim 1, wherein the pair of first receiving spaces is concavely formed on two bottom sides of the receiving frame, and the pair of second receiving spaces is concavely formed on two bottom sides of the keycap.

7. The magnetic suspension keyswitch structure according to claim 1, wherein the keycap has a plurality of stop protrusions protruded outward from a bottom periphery of the keycap, the receiving frame has a plurality of stop recesses formed on the inner walls, and the plurality of stop protrusions are movably disposed in the plurality of stop recesses, respectively.

8. The magnetic suspension keyswitch structure according to claim 1, wherein the pair of first magnetic members are oppositely disposed on two opposite ones of the inner walls, respectively.

9. The magnetic suspension keyswitch structure according to claim 8, wherein at least one protruding portion is formed on each of the plurality of inner walls of the receiving frame, and the at least one protruding portion abuts against at least one of the plurality of side surfaces of the keycap, so as to reduce a friction force.

10. The magnetic suspension keyswitch structure according to claim 9, wherein the at least one protruding portion is parallel to a pressing direction of the keycap.

11. A magnetic suspension keyswitch structure, comprising:

a receiving frame including a keycap receiving hole, a pair of first receiving spaces, and a pair of first magnetic members, the keycap receiving hole being surrounded by a plurality of inner walls, the pair of first receiving spaces being formed on two of the inner walls of the receiving frame, and the pair of first magnetic members being received and fixed in the pair of first receiving spaces, respectively; and a keycap including a plurality of side surfaces, a pair of second receiving spaces, and a pair of second magnetic members, the pair of second receiving spaces being respectively formed on two of the plurality of side surfaces of the keycap, and the pair of second magnetic members being received and fixed in the pair of second receiving spaces, respectively;

wherein, through a magnetic force between the pair of first magnetic members and the pair of second magnetic members, a top surface of the keycap is normally higher than a top surface of the receiving frame and in a non-pressed state; wherein, when the keycap is pressed downward, the magnetic force provides a recovering force to the keycap;

wherein at least one of the inner walls of the receiving frame is formed to have an upper erected surface, an inner stepped surface, and a lower erected surface, and the inner stepped surface is connected between the upper erected surface and the lower erected surface; wherein at least one of the plurality of side surfaces of the keycap is formed to have an upper side, an outer stepped side, and a lower side, and the outer stepped side is connected between the upper side and the lower side; wherein, when the keycap is in the non-pressed state, the outer stepped side abuts against the inner stepped surface.

12. A magnetic suspension keyswitch structure, comprising:

a receiving frame including a keycap receiving hole, a pair of first receiving spaces, and a pair of first magnetic members, the keycap receiving hole being surrounded by a plurality of inner walls, the pair of first receiving spaces being formed on two of the inner walls of the receiving frame, and the pair of first magnetic members being received and fixed in the pair of first receiving spaces, respectively; and a keycap including a plurality of side surfaces, a pair of second receiving spaces, and a pair of second magnetic members, the pair of second receiving spaces being respectively formed on two of the plurality of side surfaces of the keycap, and the pair of second magnetic members being received and fixed in the pair of second receiving spaces, respectively;

wherein, through a magnetic force between the pair of first magnetic members and the pair of second magnetic members, a top surface of the keycap is normally higher than a top surface of the receiving frame and in a non-pressed state; wherein, when the keycap is pressed downward, the magnetic force provides a recovering force to the keycap;

wherein at least one of the inner walls of the receiving frame is formed to have a first inclined surface, and at least one of the plurality of side surfaces of the keycap is formed to have a second inclined surface; wherein, when the keycap is in the non-pressed state, the second inclined surface abuts against the first inclined surface.

* * * * *